United States Patent [19]

Shutt

[11] 4,372,520

[45] Feb. 8, 1983

[54] SUSPENSION FOR THREE-AXIS ACCELEROMETER

[75] Inventor: Sidney G. Shutt, Brea, Calif.

[73] Assignee: Rockwell International Corporation, El Segundo, Calif.

[21] Appl. No.: 292,541

[22] Filed: Aug. 13, 1981

[51] Int. Cl.³ .................... G01P 15/02; F16M 13/00
[52] U.S. Cl. ........................................ 248/604; 73/514
[58] Field of Search .................. 73/514, 515, 516 R, 73/517 R, 517 B, 497, 510; 248/573, 603, 604, 618; 308/2 A

[56] References Cited

U.S. PATENT DOCUMENTS

| 2,976,733 | 3/1961 | Litman et al. | 73/517 B X |
| 3,339,419 | 9/1967 | Wilcox | 73/517 B |

FOREIGN PATENT DOCUMENTS 243971  2/1970  U.S.S.R. ........................... 73/517 R

Primary Examiner—James J. Gill
Attorney, Agent, or Firm—Gilbert H. Friedman; H. Fredrick Hamann

[57] ABSTRACT

A proof mass for an accelerometer is electromagnetically constrained in three orthogonal directions. An array of filaments forms an elastic suspension for the proof mass to constrain it in the remaining degrees of freedom. The resulting instrument has the potential for low cost and high-accuracy operation over a wide temperature range without the use of temperature controls. An improved transition device provides a relatively simple, controllable and inexpensive means for temperature stabilizing the elastic suspension.

9 Claims, 15 Drawing Figures

SUSPENSION FOR THREE-AXIS ACCELEROMETER

RELATED APPLICATIONS

This application is related to the following concurrently filed applications, which are incorporated herein by reference: (1) Shutt, "Three-Axis Accelerometer," U.S. patent application No. 292,460; (2) Shutt, "Three-Axis Accelerometer Having Dynamic Bias Compensation," U.S. patent application No. 292,545; (3) Shutt, "Electromagnet Configuration for Three-Axis Accelerometer," U.S. patent application No. 292,550; (4) Shutt et al., "Three-Axis Accelerometer Having Improved Magnet Configuration," U.S. patent application No. 292,544; and (5) Shutt, "Three-Axis Accelerometer Having Flexure Bearing With Overload Protection," U.S. patent application No. 292,543. All of the applications listed above are assigned to Rockwell International Corporation, the assignee herein.

BACKGROUND OF THE INVENTION

1. Field of the Invention

The present invention relates generally to accelerometers and more particularly pertains to accelerometers in which a proof mass is constrained by a combination of electromagnetic and elastic supports.

2. Description of the Prior Art

Electromagnetic force rebalance accelerometers are well known. In this type of accelerometer, a proof mass is constrained by force generated in a current-carrying conductor or coil located in a magnetic field. Such accelerometers have typically been built as single-degree-of-freedom instruments. Thus, three such accelerometers are required to be included in an inertial navigation system. Such a system obviously tends to be more costly and complex than would be one which performed its function using fewer instruments. Furthermore, in such a single-degree-of-freedom accelerometer, a structural member of substantial size and mass is typically required to center and maintain the alignment of the coil at the full rated acceleration of the instrument in two of the three directions. This structural member, however, tends to augment the null drift or bias uncertainty of the accelerometer, primarily because of dimensional changes which result from ambient temperature variations. In order to reduce this bias uncertainty, accelerometers intended for use in high-performance navigation systems are typically provided with temperature control elements for holding the temperature-sensitive portions of the instrument at a relatively constant temperature. The need for temperature control in accelerometers is another factor tending to increase the cost and complexity of inertial navigation systems.

SUMMARY OF THE INVENTION

It is an object of this invention to overcome the above-noted shortcomings of the prior art.

Another object of the invention is to provide an accelerometer in which bias uncertainty due to temperature variations is greatly reduced.

Still another object is to provide an accelerometer which can be used over a wide range of ambient temperature variations without a need for temperature control.

A further object is to provide an accelerometer capable of measuring acceleration simultaneously along the three orthogonal axes of a Cartesian coordinate system.

A still further object of the invention is to provide an accelerometer having high accuracy.

Another object is to provide an accelerometer which is inexpensive to fabricate.

Yet another object is to provide an accelerometer which is suitable for use in a strapdown inertial navigation system.

Still another object is to provide a single accelerometer which provides all of the acceleration information needed for an inertial navigation system.

According to the present invention, the foregoing and other objects are attained in an accelerometer having a proof mass supported and constrained relative to the accelerometer case or housing by forces generated electromagnetically in each of three orthogonal directions. A magnet is disposed to establish a constant magnetic field across a gap. Coils for carrying electric current are disposed in the gap. When appropriate coils are selectively energized, sufficient force can be applied to the proof mass along each of the three axes of a set of Cartesian coordinates to keep the proof mass substantially centered at its null position. Each of three distinct currents in the coils is associated with and is a measure of the force applied along a corresponding distinct one of the orthogonal axes to maintain the proof mass centered. Thus, each current is also a measure of the acceleration along the corresponding axis.

The magnetic suspension described above provides constraint for the proof mass in three degrees of freedom. To provide constraint for three additional degrees of freedom, the proof mass is also constrained or balanced by an elastic suspension. The magnetic suspension is designed to supply the overwhelming preponderance of the force required to balance or confine the proof mass. Therefore, the elastic suspension is called upon to provide relatively very small forces. In the preferred embodiment, the elastic suspension is an array of very fine filaments preloaded in tension at a force equivalent to an acceleration significantly less than the acceleration required to be balanced by the magnetic suspension. The tendency of this elastic suspension to cause bias uncertainty in the accelerometer due to the dimensional changes resulting from variations in temperature or other causes is thus reduced over that in a prior art single-axis electromagnetic force balance accelerometer having the same range of operation. There is a potential reduction in bias uncertainty by a factor equal to the ratio of the larger load balanced by the magnetic suspension to the smaller load balanced by the elastic suspension.

For example, in one preferred embodiment, the magnetic suspension is capable of balancing the proof mass at linear input accelerations to ±15 g. In this case, the filaments need carry only small loads equivalent to 0.5 g. The force on the elastic suspension is a maximum of 400 dynes at 15 g's input acceleration as compared with 30,000 dynes of force required to be balanced by the magnetic suspension. Any tendency of this elastic suspension to cause bias uncertainty in the accelerometer due to variations in temperature or other causes is potentially reduced by a factor of thirty, the ratio of 15 g to 0.5 g, over that in a single-axis electromagnetic force balance accelerometer having the same range of operation.

This reduction in null drift or bias uncertainty in an accelerometer in accord with the invention makes it particularly suitable for use in strapdown navigation systems with gyroscopes having a similarly low temperature sensitivity.

The elastic suspension for the proof mass of an accelerometer in accord with the invention is an array of filaments connecting the proof mass to the accelerometer housing. In the preferred embodiment, the filaments are disposed in a plane perpendicular to the longitudinal axis of the proof mass. Such a filament array is relatively compliant in three degrees of freedom in that relatively small forces, unless balanced, can produce relatively large rotational deflections of the proof mass about its two cross axes and a relatively large translation deflection of the proof mass along its longitudinal axis. In the remaining three degrees of freedom, however, the elastic suspension is relatively stiff. Relatively large forces are required to produce only a small rotational deflection about the longitudinal axis of the proof mass and only small translational deflections of the proof mass along the two cross axes.

Pickoffs, preferably of the capacitive type, are provided in the accelerometer to sense deflection in the three compliant degrees of freedom of the elastic suspension. The pickoffs supply error signals to be fed to amplifiers which, in turn, supply current to the coils in a closed-loop force balance system.

An accelerometer in accord with this invention is inexpensive to fabricate because it has a relatively low part count per axis. This makes it simple to assemble. It is a three-axis sensor which is only about as complex as a single-axis unit. In addition, the dimensional tolerances and stabilities required for the individual elements of the structures are relatively relaxed since these factors are not as critical here as in prior-art devices.

The elastic suspension described above may alternatively be termed a flexure bearing. It serves to support one member, the proof mass, with respect to another member, the base or housing. This flexure bearing is required to provide good position definition between the two members and, at the same time, low bias error or low uncertainty in the operation of the accelerometer. These requirements are met using fine filaments that are very compliant in torsion, bending and compression but very stiff in tension. A relatively straightforward approach to such a flexure bearing is discussed in connection with FIGS. 1–10 hereinafter. In the bearing shown in those figures, however, there exists a risk, or even a likelihood, that overloading or shock resulting from, for example, handling and shipping under adverse conditions will produce tensions in the filaments which exceed safe levels. If a filament is subjected to such an excessive stress level at a small displacement or elongation, it will fracture before a mechanical stop of practical dimensions can be reached for support.

In all embodiments of this invention, the elastic suspension of filaments is designed to be relatively compliant in three degrees of freedom and relatively stiff in the remaining three degrees of freedom while operating at loads within a selected design load. However, in a preferred embodiment of the accelerometer described herein, the elastic suspension is further designed to be relatively compliant in all six degrees of freedom when the lateral load exceeds the selected design load. Sufficient deflection of the suspension or bearing occurs at such an overload to bring the proof mass to a mechanical stop for support before excessive stress can fracture a filament.

Avoiding a structural break is one obvious advantage of the invention. However, there is an additional more subtle advantage. When a prior-art accelerometer receives a shock, mechanical hysteresis can cause a significant bias shift even in the absence of structural breakdown. An embodiment described herein tends to eliminate such bias shifts.

Ceramic materials are preferred for use in fabricating some or all of the base or housing for the accelerometer. A metallic material is preferred for use in fabricating the filaments. A problem arises in mounting the filaments on a ceramic portion of the housing in such a way as to maintain the preload tension on the filaments relatively constant in the face of significant variations in temperature. The problem arises because the metal of the filaments has a relatively high or large thermal coefficient of expansion while the ceramic material of the case has a relatively low or small thermal coefficient of expansion. This is a mismatch problem which may be solved by careful attention to relative dimensions and geometry as will be explained hereinafter in connection with the discussions of FIGS. 3, 4 and 7 hereinafter.

However, in the embodiment of the invention claimed herein, the problem of thermal coefficient mismatch between metal filaments and a ceramic housing portion on which the filaments are mounted is solved in a simpler, more controllable and less expensive way. A transition device consisting of a mounting frame fabricated from the same metal as the filaments provides a means for temperature stabilizing the elastic suspension. The mounting frame has a central hub substantially centered on the longitudinal axis of the proof mass. The hub is attached to the case in the vicinity of the points at which the inward ends of the filaments are attached to the proof mass. The outward ends of the support filaments are attached to a mounting ring portion of the mounting frame, the mounting ring having a larger radial dimension than the hub by roughly the length of the support filaments. The mounting ring is supported by and attached to the hub by a plurality of radially extending spokes spaced apart from each other and extending outward from the hub. The spokes are disposed in a plane substantially parallel to and spaced apart from the plane of the filaments.

With such a design for a transition ring, changes in temperature tending to change the length of the support filaments, and therefore tending to change their preload tension, are compensated by substantially equivalent changes in the dimensions of the mounting frame. Variations in the bias due to temperature-induced changes in filament tension are thereby minimized.

DESCRIPTION OF THE PREFERRED EMBODIMENT

Figure 1:
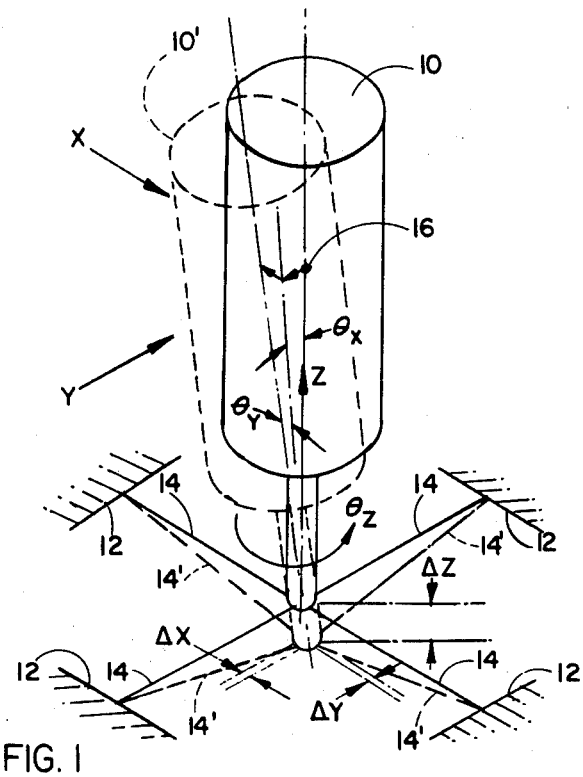
FIG. 1 is a diagrammatic sketch of a proof mass for an accelerometer elastically suspended in accord with the invention.

Referring now to FIG. 1, there is shown a simplified sketch of a proof mass 10 elastically suspended from a housing or base 12 for an accelerometer in accord with the invention. The elastic suspension connecting the proof mass 10 to the base 12 includes an array of four support filaments 14 disposed in a plane perpendicular to the longitudinal axis, the Z axis, of the proof mass 10. In the example of FIG. 1, the filaments 14 are spaced apart from each other at regular ninety-degree intervals in a plane near an end of the proof mass 10.

The support filaments 14 are preloaded in tension at a force equivalent to an acceleration load less than the rated acceleration load of the accelerometer by a factor of at least about fifty.

In an accelerometer according to the invention, the major proportion of the force required to constrain deflection of the proof mass 10 relative to the base 12 is provided by electromagnetic forcer coils not shown in FIG. 1. The forcer coils are shown in and discussed further in connection with FIGS. 3, 4, 6, 8, 9 and 10. The coils operate in an electromagnetic force balance system. They are capable of being selectively energized to provide a resultant force acting substantially through the center of mass of the proof mass 10 as indicated at 16. A component force can be applied along any one or any combination of the three axes, X, Y and Z, of a Cartesian coordinate system fixed to the proof mass 10. Z is the longitudinal axis of the proof mass 10, as noted above, while X and Y are a pair of cross axes. In FIG. 1, the cross axes X and Y are shown in alignment with corresponding pairs of the filaments 14 for convenience, but this alignment is not a requirement. Since the forcer coils constrain the proof mass 10 in only three degrees of freedom, the elastic suspension of filaments 14 is required to provide restraint in the remaining degrees of freedom and to establish a stable null position.

If the center of mass of the proof mass 10 and the center of action of the electromagnetic forcers are displaced, an additional elastic suspension force will be required to constrain the proof mass. For example, if the center of action and center of mass are displaced by 0.01 cm, an additional elastic suspension force of 200 dynes is required to support the proof mass 10 when there is a 10 g input acceleration normal to the Z axis.

Actually, the elastic suspension of filaments 14 constrains the proof mass 10 in all six degrees-of-freedom. It provides a relatively very stiff translation support along the cross axes X and Y and relatively very stiff rotational support about the longitudinal or Z axis. Thus, relatively large forces can produce only relatively small translational deflections $\Delta x$ and $\Delta y$ and a relatively small rotational deflection $\theta_z$. The relatively small translational deflection $\Delta x$ and $\Delta y$ along the two cross axes are on the order of $3.8 \times 10^{-8}$ centimeters per dyne at rated acceleration input. The relatively small rotational deflection $\theta_z$ is on the order of $6 \times 10^{-7}$ radians per dyne-centimeter at rated acceleration input. In the remaining three degrees of freedom, the elastic suspension of filaments is relatively compliant. Thus, relatively small forces can produce relatively large rotational deflections $\theta_x$ and $\theta_y$ and a relatively large translational deflection $\Delta z$, along the longitudinal axis of the proof mass 10. The relatively large rotational deflections $\theta_x$ and $\theta_y$ about the two cross axes is on the order of $2 \times 10^{-3}$ radians per dyne-centimeter at rated acceleration input. The relatively large translational deflection $\Delta z$ along the longitudinal axis is on the order of $2 \times 10^{-4}$ centimeters per dyne at rated acceleration input. Thus, at rated acceleration, the translational deflection of the proof mass along the longitudinal axis is greater than the translational deflection along a cross axis by a factor of about $1.9 \times 10^4$. Similarly, the rotational deflection of the proof mass about a cross axis is greater than the rotational deflection about the longitudinal axis by a factor of about $3 \times 10^4$. In FIG. 1 the proof mass 10′, depicted in phantom, is shown deflected from its null position to illustrate the discussion above. In actual operation of the accelerometer, the electromagnetic force balance system would operate to keep all such deflections negligibly small.

Figure 2:
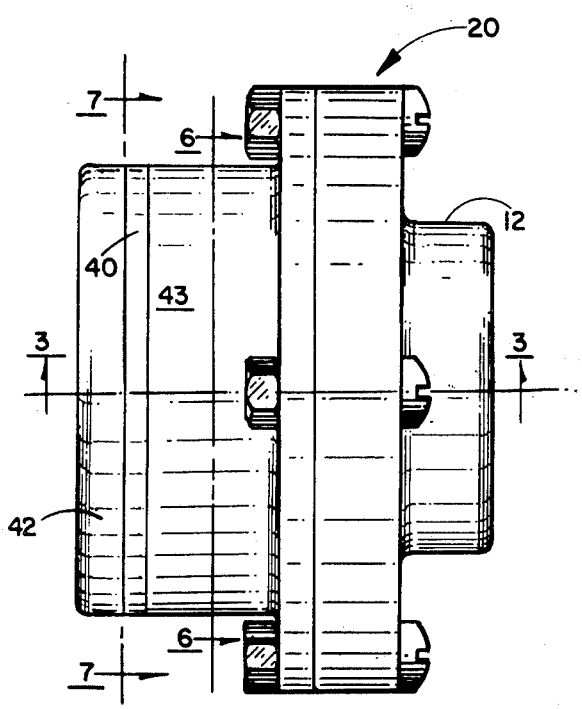
FIG. 2 is a view in elevation of an assembled accelerometer.

Referring now to FIG. 2, there is shown an assembled accelerometer 20 in accord with the invention. A housing or case 12 for the accelerometer 20 is fabricated from any suitable non-magnetic material such as, for example, aluminum or a ceramic such as beryllia.

Figure 3:
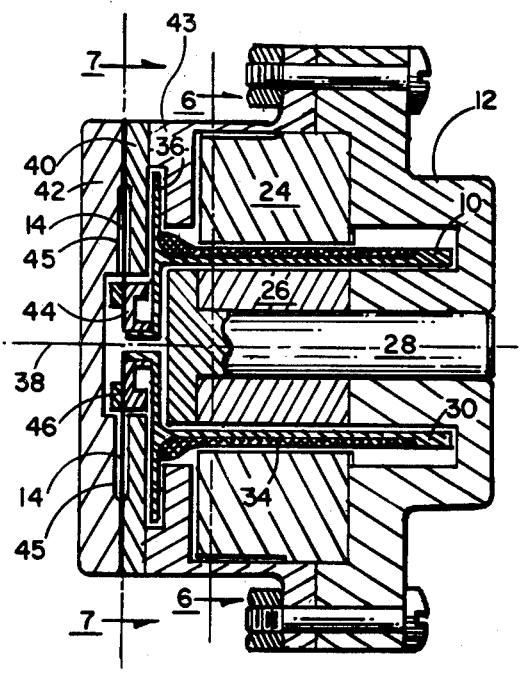
FIG. 3 is a cross-section of the accelerometer of FIG. 2 taken along the line 3—3.
Figure 4:
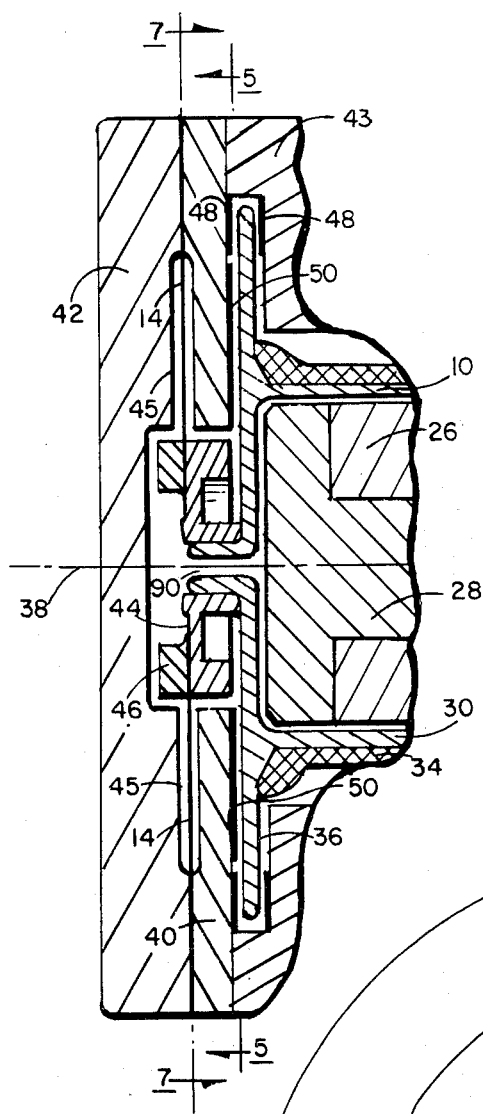
FIG. 4 is a portion of FIG. 3 enlarged to show more detail.

The working parts of the accelerometer 20 are shown in FIGS. 3 and 4. A magnet ring 24 is mounted on the housing 12. Interior of the magnet 24, coaxial therewith and spaced apart therefrom, is a flux return ring 26 mounted on an inner pole piece mounting member 28. The magnet 24 establishes a constant or time-invariant magnetic field across a gap between it and the flux return ring 26. Disposed in the gap is the coil form 30 portion of a proof mass 10. An assembly of electromagnetic forcer coils 34 is disposed on the coil form 30 for applying forces to the proof mass 10 in three orthogonal directions. At an end of the proof mass 10, the left side thereof in FIGS. 3 and 4, the proof mass 10 is flared into a disk portion 36.

The proof mass 10 is suspended from the housing 12 by an array of filaments 14 disposed in a plane substantially perpendicular to the longitudinal axis 38 of the proof mass 10. The outward portion of each filament 14 is clamped between the inner surfaces of a clamping ring 40 and a housing cap 42. The other surface of the clamping ring 40 is fastened to a housing member 43. Housing member 43 is part of the housing 12. Mating grooves in the clamping ring 40 and the housing cap 42 are provided to form a cavity 45 which is directed along a filament 14 and which permits the central portion of each filament 14 to be free of contact with the structure. The inward portion of each filament 14 is clamped between the inner surfaces of a clamping disk 44 and a cover ring 46. The other surface of the clamping disk 44 is fastened to the proof mass 10.

The filaments 14 are preferably formed of a material suitable not only for carrying the required load but a material which is also a good conductor of heat and electricity such as, for example, beryllium copper. Good electrical and thermal conductivity are desired so that the filaments 14 may also serve as conductors for supplying current to the forcer coils in forcer coil assembly 34.

The predominant sources of bias uncertainty in an accelerometer 20 according to the invention are related to a change in the forces exerted by the filaments 14 on the proof mass 10. In order to minimize any change in these forces as temperature variations occur, dimensions of the filaments 14 and the filament mounting parts 40, 42, 43, 44 and 46 and the materials used to form the parts are chosen so that thermal expansion and contraction of the filaments and filament mounting parts over a wide temperature range produces a negligible change, if any, in the tension preload on the filaments 14. The manner in which the filaments 14 are preloaded in tension is discussed below in connection with FIG. 7.

In order to achieve this stability of the preload on the filaments 14 over a wide temperature range, the filament mounting parts 40, 42, 43, 44 and 46 are preferably made of materials that have a high degree of dimensional stability with variations in temperature. Clamping ring 40, housing cap 42 and housing member 43 are preferably made of a ceramic material such as, for example, beryllia. Clamping disk 44 and cover ring 46 are preferably made of a material having only a negligible change in dimensions with changes in temperature such as, for example, Cer-Vit.

In addition, in order to keep the preload on the filaments 14 stable over a wide temperature range, the nominal length of a cavity 45 formed by grooves in the clamping ring 40 and housing cap 42 is selected so that expansion or contraction of the filaments 14 tending to lessen or increase their preload tension is compensated by expansion or contraction of the length of a cavity 45. A cavity 45 expands or contracts due to thermal expansion or contraction in the clamping ring 40 and housing cap 42. As a cavity 45 lengthens or shortens due to changes in temperature, that point at which the outward portion of a filament 14 is clamped between clamping ring 40 and housing cap 42 moves away from or closer to the point at which the inward end of a filament 14 is clamped between clamping disk 44 and cover ring 46. The latter point exhibits negligible change, of course, since clamping disk 44 and cover ring 46 are of Cer-Vit or the like.

An example of thermally caused changes in dimension will be given here for the filament shape shown in FIG. 7. In this example, the nominal length of the unclamped portion of a filament 14 extending through a cavity 45 is 0.40 cm. A line extending from the longitudinal axis 38 to the point at which the outward portion of a filament 14 is clamped between clamping ring 40 and housing cap 42 has a length of 0.73 cm. The angle between said line and said filament is 18 degrees. See the discussion of FIG. 7 for a further explanation of this angle. For a temperature variation from $-55°$ C. to 70° C., the change in the length of the unclamped portion of a filament 14 is $0.0044 \times 10^{-6}$ centimeters per degree Celsius. For a filament 14 having a square cross-section of 0.0015 cm on a side, the change in tension is less than four dynes. Since the nominal preload tension is 200 dynes, this change in tension is less than two percent over the temperature range.

When the preload tension in the filaments 14 changes, the accelerometer biases change also. For example, if the filaments 14 are out of plane alignment by 0.001 cm, then the X or Y axis bias uncertainty changes by less than $0.1 \times 10^{-6}$ g per degree Celsius and the Z axis bias uncertainty changes by less than $0.5 \times 10^{-6}$ g per degree Celsius.

The disk portion 36 of the proof mass 10 serves as a movable plate or electrode for a plurality of capacitor pickoffs for sensing rotational deflection about the cross axes X and Y and for sensing translation deflection along the longitudinal or Z axis of the proof mass 10. The body of the proof mass 10 is excited with an alternating electric potential of, for example, five volts at a frequency of, for example, twenty kilohertz. Pickoff electrodes forming the fixed or immovable plates of sensor capacitors are disposed, preferably by plating, on surfaces of clamping ring 40 and housing member 43 adjacent to the proof mass disk 36. Those are seen more distinctly in FIG. 4 than in FIG. 3. A pair of ring-shaped electrodes 48, one on the clamping ring 40 and one on the housing member 43, form the two fixed electrodes of a capacitor pickoff element for sensing translational deflection along the longitudinal or Z axis of the proof mass 10. Another pair of electrodes 50 is disposed, diametrically opposed to each other, on the clamping ring 40. The electrodes 50 are the two fixed electrodes of a capacitor pickoff element for sensing rotational deflection about a cross axis perpendicular to the plane of the drawing, in this case the Y axis.

Figure 5:
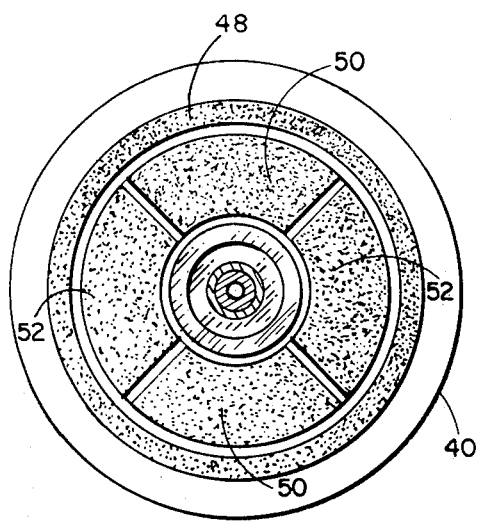
FIG. 5 is a view of electrodes for displacement pickoffs taken along the line 5—5 in FIG. 4 looking in the direction of the arrows.

FIG. 5 is a plan view of the pickoff electrodes formed on the rear surface of clamping ring 40. One of the two electrode rings 48 for sensing translational deflection of the proof mass 10 is shown. The other ring 48 is on housing member 43 as mentioned above. The pair of sector-shaped electrodes 50 for sensing rotational deflection about the Y cross axis is shown interposed between an additional pair of sector-shaped electrodes 52. The electrodes 52 are for sensing rotational deflection about the X cross axis. Each of the electrode trodes 48, 50 and 52 is spaced apart from the others and is therefore insulated from the others. Each pair of electrodes 48, 50 and 52, respectively, is connected into a bridge circuit, well known to those skilled in the art, for generating a signal proportional to the respective deflection.

It should be noted that, in this accelerometer, the mount for the filaments 14 relative to the pickoff electrodes 48, 50 and 52 has been designed and constructed for maximum stability in the face of temperature variations. This is accomplished by suspending the filaments 14 from the front surface of clamping ring 40 while the majority of the pickoff electrodes are formed on the rear surface of the same single-piece, temperature-stable, ceramic part, i.e., clamping ring 40.

Figure 7:
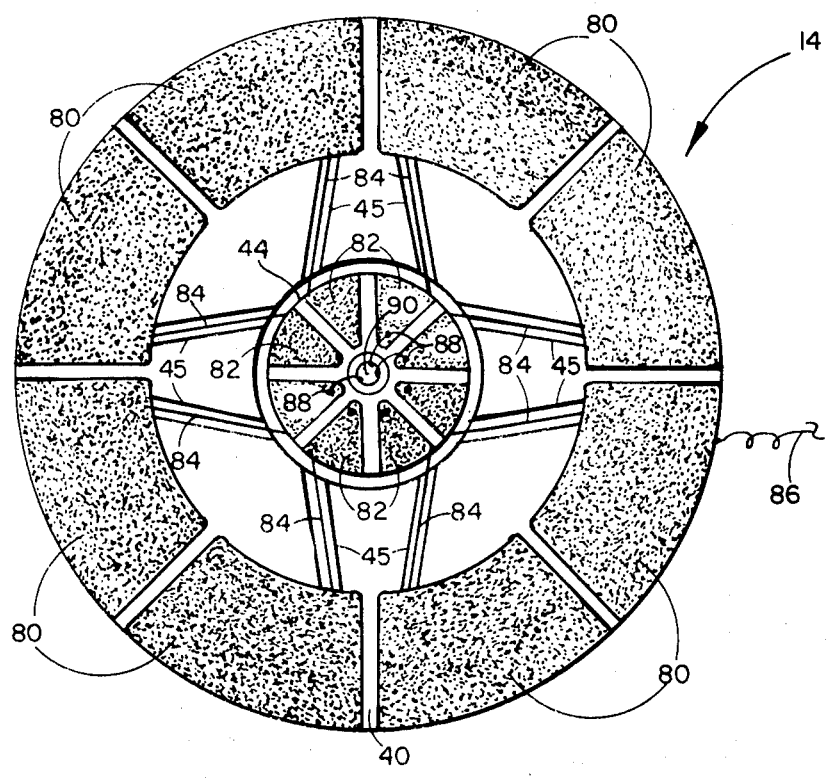
FIG. 7 is a cross-section taken along the lines 7—7 of FIGS. 2, 3 and 4 showing filaments for an elastic suspension.

FIG. 7 shows the array of support filaments 14 in more detail. In this embodiment eight support filaments 14 are used. An individual support filament 14 has an outward portion 80, an inward portion 82 and an intermediate portion 84. The outward portion 80 is disposed on the clamping ring 40. The inward portion 82 is disposed on the clamping disk 44. The intermediate portion 84 is the very fine unclamped part of the filament intended to be disposed in the cavity 45 formed by the mating grooves in the clamping ring 40 and housing cap 42.

As is apparent in FIG. 7, the eight support filaments 14 of this embodiment are disposed as four pairs, a pair consisting of each two filaments which are closer to each other than to the remaining filaments. Furthermore, a filament 14 does not extend radially but is directed at an angle relative to a radial line which intersects the filament at the point where the intermediate portion 84 and the outward portion 80 meet, the point at which the filament is clamped between clamping ring 40 and housing cap 42. In this embodiment, the angle between this radial line and each filament 14 is 18 degrees.

The support filaments 14 may be formed from a single sheet of beryllium copper, preferably about 0.0015 cm thick. At an elevated temperature of, for example, 100° C., the outer portion of the beryllium copper sheet is cemented to the beryllia clamping ring 40. The cement is then cured. At a reduced temperature of, for example, 95.42° C., the inner portion of the beryllium copper sheet is then cemented to the Cer-Vit clamping disk 44. After curing the new cement, the beryllium copper sheet is etched to form the pattern of filaments 14 shown in FIG. 7. Each filament intermediate portion 84 may be etched to have, for example, a 0.0015 cm square cross-section. Cer-Vit cover ring 46, as shown in FIGS. 3 and 4, is then cemented over the inner portion of the filaments 14. The new cement is cured as before. This procedure sets up a tension preload in each filament 14. In this example, the tension preload is about 200 dynes. This preload tension will change no more than about 2% as the temperature varies in the range from −55° C. to 70° C.

An electrical conductor 86 is shown connected to an outward portion 80 of a support filament 14 for carrying coil current. Another conductor 88 for carrying coil current is shown connected to an inward portion 82 of a different support filament 14. The conductor 88 extends through the center aperture 90 of clamping disk 44 for connection to a forcer coil.

Figure 9:
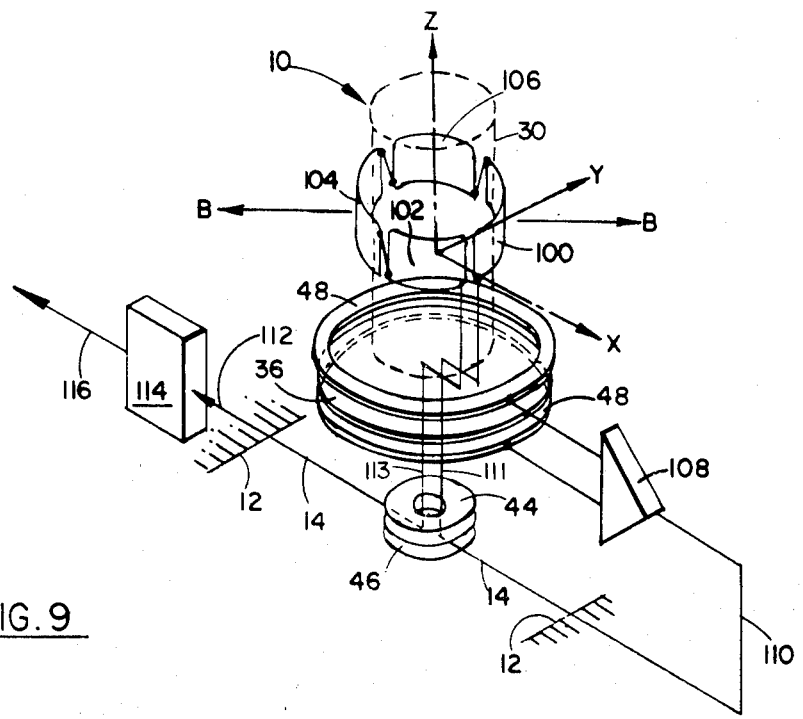
FIG. 9 is a sketch showing the longitudinal axis electromagnetic forcer coils interconnected in a closed force-balance control loop.

FIG. 9 shows forcer coils 100, 102, 104 and 106 interconnected in a closed-loop force balance system which provides a resultant force substantially at the center of mass of the proof mass 10, wherein the force is directed along the longitudinal or Z axis. These four coils are connected in series and are disposed circumferentially on the coil form portion 30 of the proof mass 10. As shown in FIG. 7, only one circumferentially-extending leg of each of substantially flat coils 100, 102, 104 and 106 is interposed directly in the gap between the magnet 24 and the flux return ring 26. The remaining circumferentially-extending leg of these coils is displaced from the gap. Thus, the first-mentioned leg of each coil provides the bulk of the force induced when the coil carries current.

Furthermore, the polarity of the radial magnetic field alternates in space from one coil to the next adjacent coil. For example, as indicated in FIG. 9 by the arrows marked B, the magnetic field may be directed positive radially outward at coils 100 and 104. In this case, it is directed positive radially inward at coils 102 and 106. To accommodate this alternating polarity of the field, the coils 100, 102, 104 and 106 are so connected in series that the current is directly oppositely in adjacent coils. Thus, when current is flowing counterclockwise in coils 100 and 104, for example, it is flowing clockwise in coils 102 and 106.

A signal from the pair of fixed pickoff electrode rings 48 for sensing translational deflection is fed to Z axis control amplifier 108. A forcing current to constrain longitudinal deflection of the proof mass 10 is output by the control amplifier 108. The forcing current is carried by a conductor 110 and by an elastic suspension filament 14 and a conductor 111 to forcing coils 100, 102, 104 and 106. The circuit is completed through a conductor 113 and another elastic suspension filament 14, a conductor 112, and an output circuit 114. The signal output 116 of circuit 114 is preferably in digital format.

Figure 6:
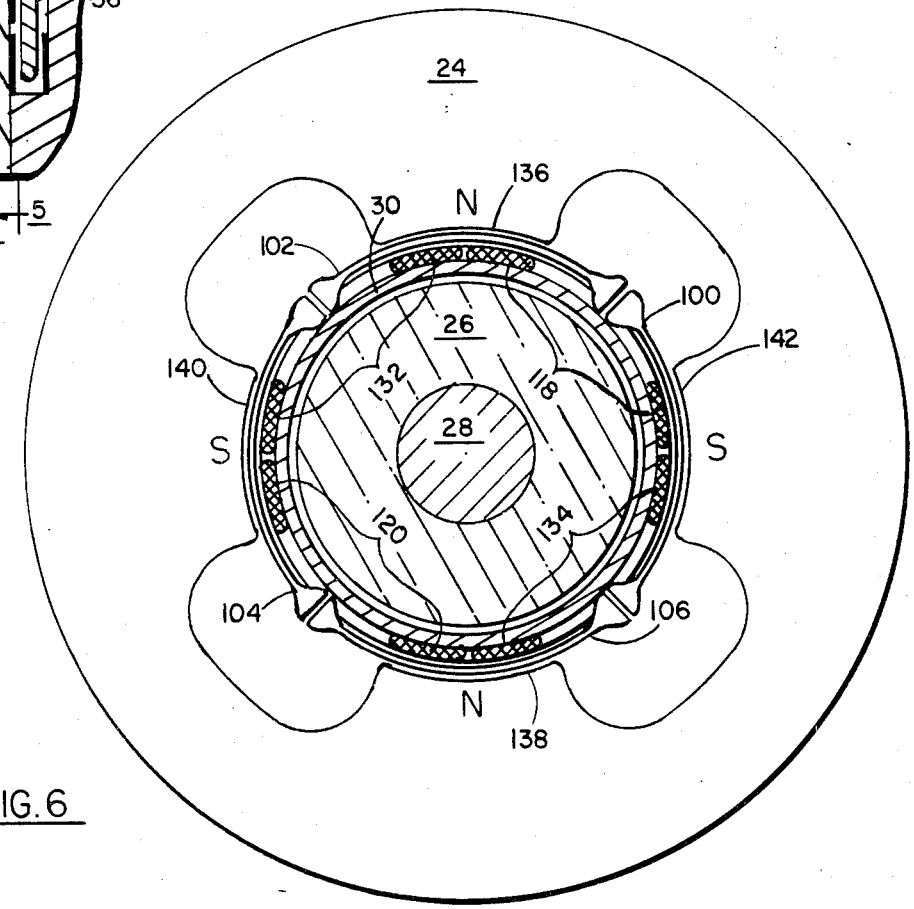
FIG. 6 is a cross-section taken along the lines 6—6 of FIGS. 2 and 3 showing the disposition of the electromagnetic forcer coils.
Figure 10:
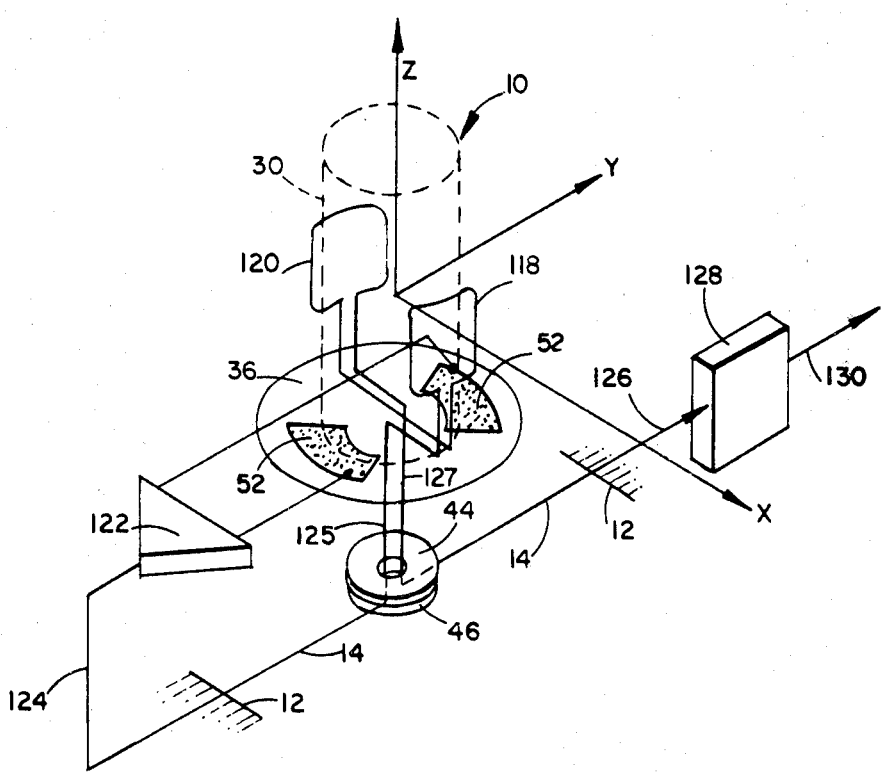
FIG. 10 is a sketch showing a pair of cross-axis forcer coils interconnected in a closed force-balance control loop.

FIG. 10 shows substantially flat forcer coils 118 and 120 interconnected in a force balance system to provide electromagnetic forcing and constraint along the Y cross axis of the proof mass 10. These two coils are connected in series and are so disposed opposite each other along the X axis on the coil form portion 30 of the proof mass 10 as to provide a resultant force directed along the Y axis acting substantially at the center of mass of the proof mass 10. As shown in FIG. 6, each of the longitudinally-extending legs of each of coils 118 and 120 is interposed directly between the magnet 24 and the flux return ring 26. However, the polarity of the radial magnetic field alternates in space from one longitudinally-extending leg to the other of each of coils 118 and 120. As a result, current flowing in the coils 118 and 120 produces both a force along the Y axis and, since the center of mass of the proof mass 10 is displaced from the point at which it is elastically suspended, a torque about the X axis.

A signal from the pair of fixed, sector-shaped pickoff electrodes 52 for sensing rotational deflection about the X axis is fed to control amplifier 122. A forcing current proportional to the X axis rotational deflection of the proof mass 10 is output by the control amplifier 122. The forcing current is carried by a conductor 124, by an elastic suspension filament 14 and by a conductor 125 to forcing coils 118 and 120. The circuit is completed through conductor 127, another elastic suspension filament 14, a conductor 126, and an output circuit 128. The signal output 130 of circuit 128 is preferably in digital format.

An additional pair of substantially flat forcer coils, displaced about the Z axis by ninety degrees from coils 118 and 120 is disposed on the coil form portion 30 of the proof mass 10. These coils are interconnected in another force balance system similar to the one shown in FIG. 10 to provide electromagnetic forcing along the X cross axis. This additional pair of forcer coils is not shown in FIG. 10.

Returning now to FIG. 6, the full assembly of electromagnetic forcer coils 34 is shown in cross-section disposed on the coil form portion 30 of the proof mass 10. Shown are portions of the Z axis forcer coils 100, 102, 104 and 106, the Y axis forcer coils 118 and 120, and a pair of X axis forcer coils 132 and 134. The coil assembly is disposed in the space between the four-pole magnet ring 24 and the flux return ring 26. As indicated by the polarity markings N on opposing poles 136 and 138 of the magnet ring 24 and by the polarity markings S on opposing poles 140 and 142, magnet ring 24 is so magnetized that the polarity of the radial magnetic field in the gaps between adjacent poles of magnet ring 24 and flux return ring 26 alternates in space. This was mentioned above in the discussion of FIGS. 9 and 10. Each of the cross-axis forcing coils 118, 120, 132 and 134 has one longitudinally-extending leg in the gap between a north pole and the flux return ring 26 and the other longitudinally-extending leg in the gap between a south pole and the flux return ring 26. Each of the Z axis forcing coils 100, 102, 104 and 106 has only one circumferentially-extending leg in the gap between either a north pole or a south pole and the flux return ring 26. This disposition of the coils was mentioned previously in the discussion of FIGS. 9 and 10.

The magnet ring 24 is shunt compensated for temperature variations in a way well known to those skilled in the art. A Carpenter 30 alloy, for example, may be used for this purpose.

Figure 8:
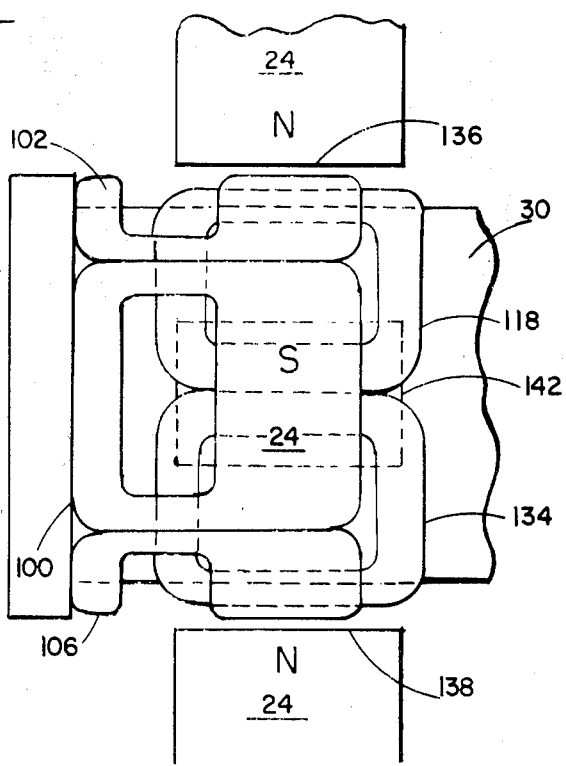
FIG. 8 is a view in elevation of the electromagnetic forcer coils.

FIG. 8 is another view of the electromagnetic forcer coil assembly 34. The Z axis forcer coils 100, 102 and 106 are shown, each with one circumferentially-extending leg directly under a pole of magnet ring 24 and the other circumferentially extending leg displaced from the poles so as to provide a force directed longitudinally with this type of magnet ring 24.

The cross-axis forcer coils 118 and 134 in FIG. 8 each have one longitudinally-extending leg under a north pole and one under a south pole so as to provide a force directed radially with this type of magnet ring 24.

In the discussion of FIG. 7, it was indicated that the support filaments 14 might be fabricated to have a square cross section. Actually, it is preferable that the filaments be made relatively wide and thin. A minimum for the cross-sectional area of a filament is determined by the amount of electric current required to be carried and the permissible electrical loss in the filament. Of course, the filaments 14 must each also have sufficient cross-sectional area and thickness to support the expected tensile loading and to give the suspension a required stiffness. However, for a given cross-sectional area, the smaller the filament thickness is made, the smaller will be the filament spring rates in bending and torsion. Reducing the bending and torsion spring rates is desirable in order to reduce the contributions to bias uncertainty or null drift due to such effects as material creep and the like.

The elastic suspensions for the accelerometer embodiments shown in FIGS. 1-10 each have either four support filaments or four pairs of support filaments 14. This number was chosen by way of example only. When four or more support filaments or support filament pairs are included in an elastic suspension, the suspension provides redundant constraint. The constraint is redundant because the suspension will still provide support for the proof mass 10 if a filament or a filament pair is fractured.

However, it is not necessarily advantageous to provide a redundant-constraint elastic suspension. If the procedure for attaching the support filaments 14 between the proof mass 10 and the base 12 is not sufficiently precise and leaves some slack in a filament or a filament pair, then the null position for the elastic suspension will not have a satisfactory degree of stability. Due to the extreme degree of care required to attach the filaments so that a satisfactory degree of null position stability is achieved in a redundant constraint elastic suspension, it is preferable to design the elastic suspension to use only three support filaments 14. Where no more than three support filaments 14 are used, there can be no slack. Therefore, the null position is relatively more stable. By using only three support filaments 14 in the elastic suspension, the accelerometer may be fabricated with greater ease and with larger tolerances for filament attachment. It may therefore be fabricated at lower cost.

Figure 11:
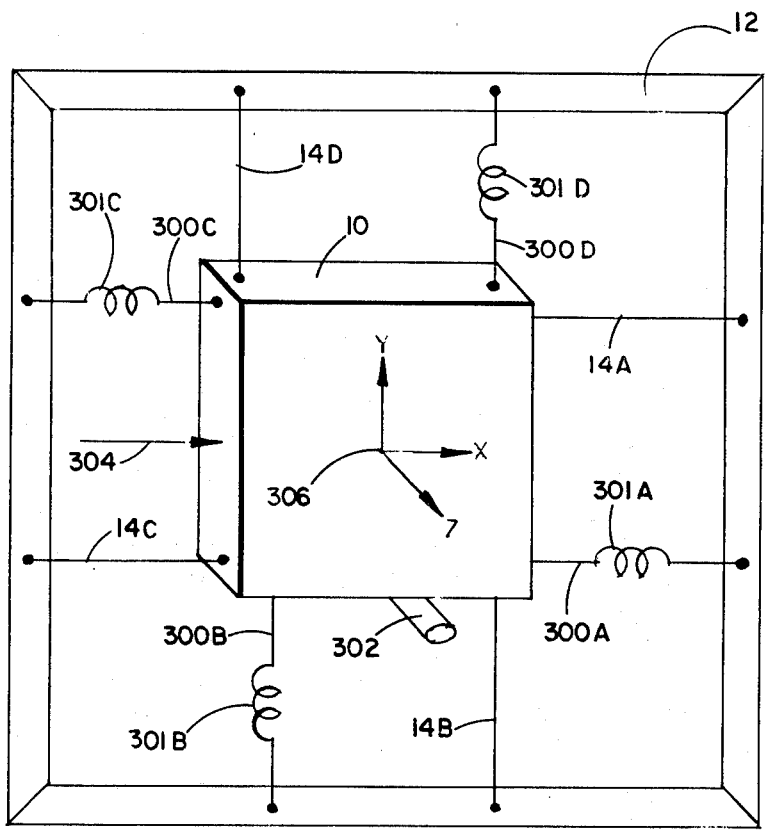
FIG. 11 is a sketch showing the operation of a flexure bearing with overload protection.

Referring now to FIG. 11, a suspended member, corresponding to a proof mass 10, is shown suspended from and supported on a base member 12 by a flexure bearing or elastic suspension having overload protection. The elastic suspension includes an array of four fully extended support filaments 14A-D disposed in a plane substantially perpendicular to the longitudinal or Z axis of the proof mass 10.

The four support filaments 14A-D are fixed or attached to and mounted between the base 12 and the proof mass 10. The support filaments 14A-D are disposed for minimum displacement in response to lateral tensile loading. That is to say, loading on the elastic suspension which tends to cause displacement of the proof mass 10 in the plane of the cross axes X and Y produces the maximum effect possible on the tensile loading of the individual support filaments 14A-D. The support filaments 14A-D correspond to the filaments 14 of FIGS. 1, 3, 4, 7, 9 and 10.

As discussed in connection with FIG. 1, the elastic suspension of support filaments 14 is capable of relatively large translational deflection $\Delta z$ along the longitudinal axis. Therefore, it is practical to place a mechanical stop in the instrument at a location where it can support the proof mass 10 and prevent fracture of the filaments 14 due to excessive loading along the Z axis. However, because the elastic suspension of support filaments 14 is so relatively very stiff in the plane of the cross axes X and Y, a mechanical stop to prevent fracture of the support filaments 14 due to excessive loading in the X-Y plane would be required to be too close to the proof mass 10 to be practically implemented. The tolerances required would be excessively tight. Thus, interference between the proof mass 10 and a mechanical stop could occur within the normal operating range of the accelerometer, a highly undesirable situation. These same considerations would apply to an elastic suspension consisting only of the support filaments 14A-D of FIG. 11.

In order to provide an elastic suspension or flexure bearing wherein it is practical to use a mechanical stop 302 to prevent fracture of filaments due to excessive loading in the plane of the cross axes, the support filaments 14A-D are held in tension by a complementary set of spring-loaded compliant filaments 300A-D. Mechanical stop 302 is sufficiently displaced from the null position of the proof mass 10 that interference between the two is avoided at loads on the elastic suspension within the selected design load.

The four compliant filaments 300A-D are attached to and mounted between the proof mass 10 and cooperating springs 301A-D. The compliant filaments 300A-D are coplanar with the support filaments 14A-D. The cooperating springs 301A-D are, in turn, anchored to the base 12. Each of the cooperating springs 301A-D is preloaded in tension so as to apply a pull to its corresponding one of the compliant filaments 300A-D. The set of compliant filaments 300A-D are disposed to apply a torque to the proof mass 10 about the longitudinal axis thereof. A pull is thereby exerted on each of the support filaments 14A-D. In the absence of external loading, each of the support filaments 14A-D is pulled into sufficient preload tension to keep the proof mass 10 in equilibrium. As was indicated in the discussion of FIG. 1, the preload tension on the filaments 14A-D is preferably at a force equivalent to an acceleration load less than the rated acceleration load of the accelerometer by a factor of at least about fifty.

In the embodiment of FIG. 11, the compliant filaments are disposed in the plane defined by the array of support filaments 14A–D. Each compliant filament is spaced apart from and mounted parallel to a corresponding support filament. For example, compliant filament 300C is mounted parallel to and spaced apart from support filament 14C. Filaments 14C and 300C form a pair. Loading which tends to increase tension on support filament 14C also tends to increase tension on compliant filament 300C.

The effective spring constant of each of compliant filaments 300A–D is very much less than the effective spring constant of each of the support filaments 14A–D. Due to the compliance of the springs 301A–D cooperating with the compliant filaments 300A–D, each of the compliant filaments may be subjected to a relatively large displacement without significant effect on its loading and without risk of fracture.

An arrow is shown at 304 in FIG. 11 to indicate the presence of, for example, an externally applied load or force acting at the center of mass 306 of the proof mass 10 in the positive X direction. As the force 304 increases, support filament 14C elongates and the tension therein increases. Concurrently, support filament 14A shrinks in length and the tension therein decreases. There is no significant increase in tension in the compliant filament 300C mounted parallel with support filament 14C nor any significant decrease in tension in the compliant filament 300A mounted parallel with support filament 14A due to the force 304 since, as has been indicated, the compliant filaments have relatively very much smaller spring constants than do the support filaments.

So long as support filament 14A remains in tension, the displacement of the center of mass 306 of the proof mass 10 due to the load 304 will be very small. This small displacement is due to the relatively very high effective spring constants of the support filaments 14A and 14C. As the force 304 increases up to the level of the design load, the tension on filament 14A decreases to zero. Since all of the filaments, support and compliant, are fine and support negligible compressive load, further increase of the force 306 causes the proof mass 10 to rotate in the X-Y plane about the point 307 at which support filament 14C is anchored to the proof mass 10. During this rotation, additional support force for the proof mass 10 is supplied primarily by compliant filaments 300C and 300D. Since the combined effective spring constant of compliant filaments 300C and 300D is relatively very small, the elastic suspension becomes very compliant in the plane of the cross axes when the force 304 exceeds the design load. The suspended member or proof mass 10 can thus rotate and translate to fixed mechanical stop 302 with only small additional stress on the already heavily loaded support filament 14C. Fixed mechanical stop 302 then absorbs all additional load. Fracture of support filament 14C is thereby prevented.

A similar example could be readily presented for loading in each of the remaining three quadrants.

The design load at which support filament tension goes to zero is preferably at least equal to the maximum rated load for normal operation of the accelerometer.

In effect, the elastic suspension of FIG. 11 operates in the cross-axis plane at a first very high spring constant determined primarily by the support filament dimensions and material at loads up to the design load and at a second much lower spring constant determined primarily by two of the compliant filaments at loads greater than the design load.

Figure 12:
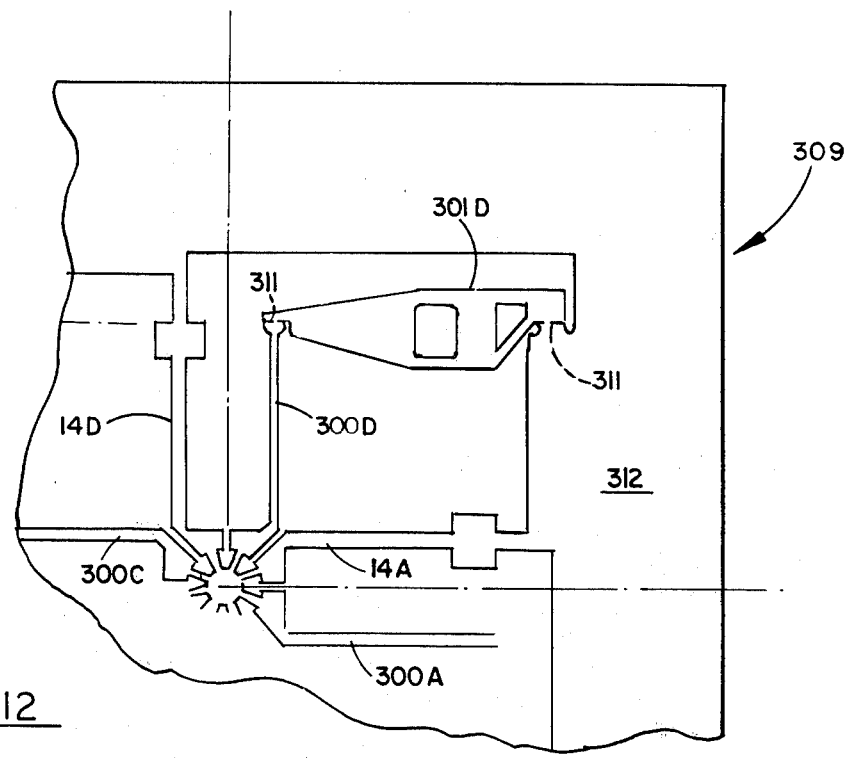
FIG. 12 is a view of parts for a flexure bearing in an unfinished state.

FIG. 12 shows slightly more than one quadrant of a thin sheet of metal 309 which has been photochemically machined to form a practical design for an array of support filaments 14A–D and compliant filaments 300A–D with their respective cooperating springs 301A–D. As has been indicated, the metal of sheet 309 is preferably beryllium copper. Support filaments 14A and 14D are shown in full. Compliant filament 300D is shown in full while only inward portions of compliant filaments 300A and 300C are visible. Compliant filament 300D is integrally joined to cooperating spring 301D which is unfinished. Cooperating spring 301D is intended to be finished to form a cantilevered spring by folding it by ninety degrees about the dotted lines indicated at 311. The metal sheet 309 includes a protective guard frame 312 as an integral part of the assembly. Guard frame 312 holds the filaments in position in a relaxed neutral state during fabrication and assembly of the elastic suspension. At the completion of assembly of the instrument, guard frame 312 is removed.

Figure 13:
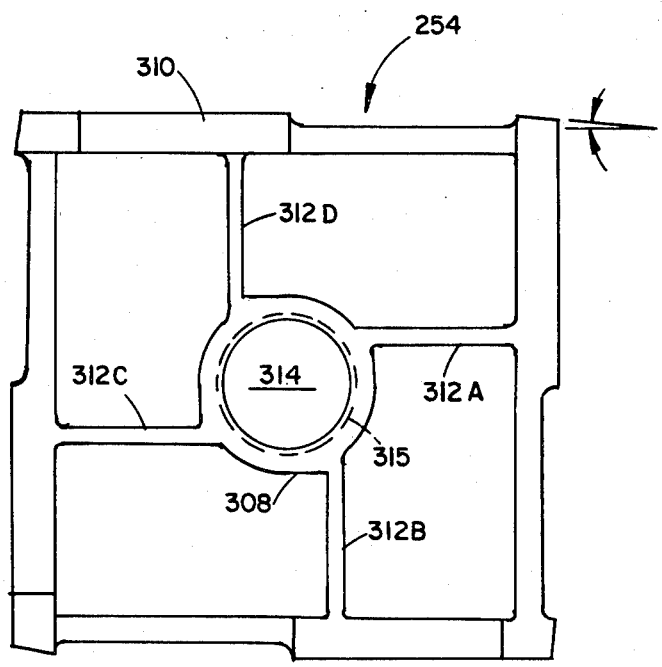
FIG. 13 is a top view of a mounting frame for a flexure bearing in accord with the invention.

A frame 254 for mounting the filaments is shown in FIG. 13. Mounting frame 254 comprises a central hub 308 having a relatively small radius and a mounting ring 310 having a relatively larger radial dimension, wherein the ring 310 is concentric with the hub 308. The frame 254 further comprises a plurality of spokes 312A–D spaced apart from each other and extending outward from the hub 308 to the ring 310. The mounting frame 254 is an integral structure in that the hub 308, the spokes 312A–D and the ring 310 are all attached to each other. Each of the spokes 312A–D is attached to the hub 308 at the spoke's inward end and is attached to the ring 310 at the spoke's outward end. As shown in FIG. 13, the ring 310 is substantially square for convenience in this embodiment. However, another shape such as, for example, that of a circle may be useful in other embodiments. As may be seen in FIG. 12, the hub 308 has a cylindrically shaped central opening 314. As may be seen more clearly in FIGS. 14 and 15, the interior wall of this central opening 314 serves as the mechanical stop for this elastic suspension in the case of excessive lateral loading.

Figure 15:
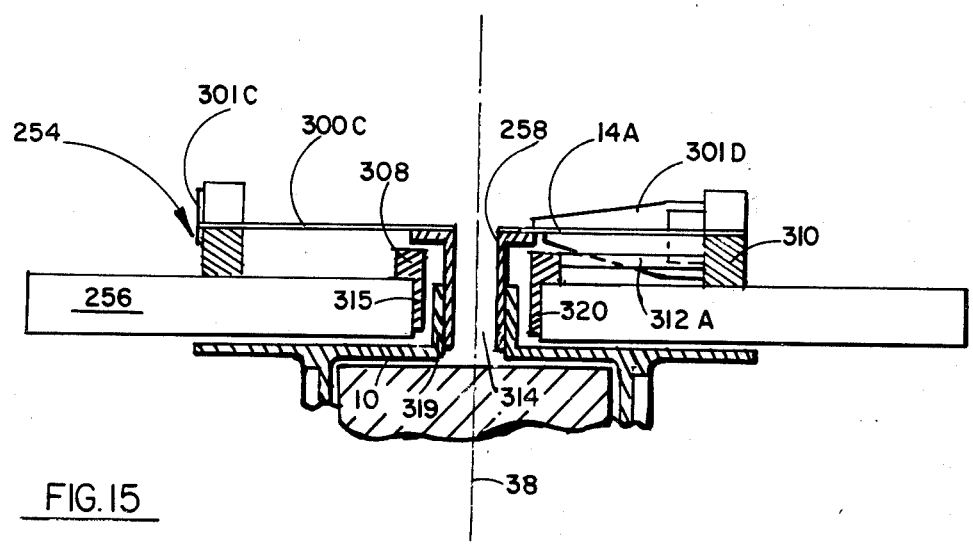
FIG. 15 is a cross-section taken along the lines 15—15 of FIG. 14.

An extension of the mounting frame 254 in the direction away from the viewer in FIG. 13 is formed as a cylindrical bushing 315. The bushing 315 is also shown in FIG. 15.

Figure 14:
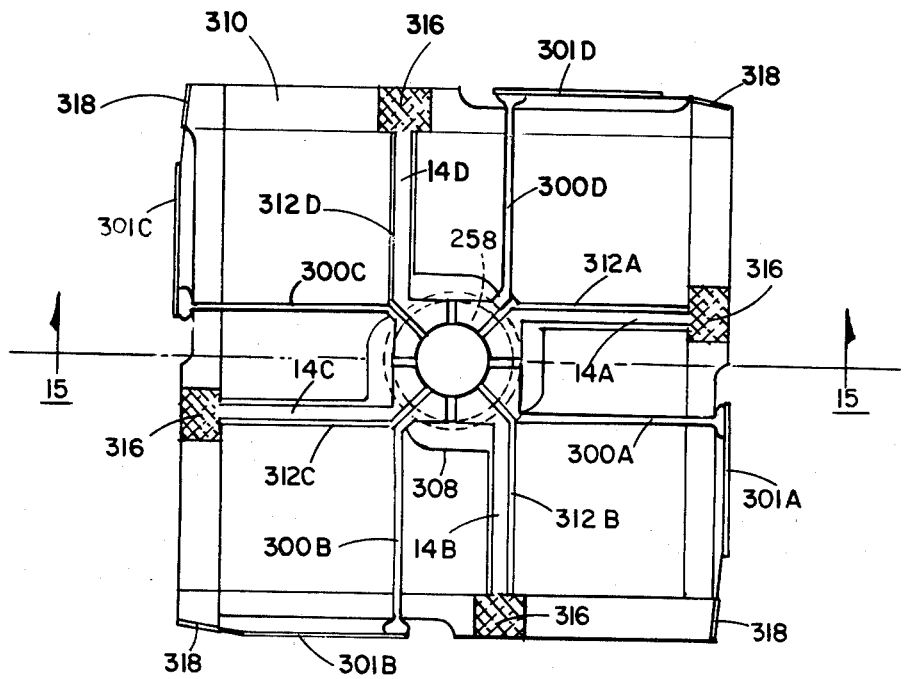
FIG. 14 shows a top view of an assembled flexure bearing.

FIG. 14 shows the array of support filaments 14A–D and compliant filaments 300A–D with their respective cooperating springs 301A–D as shown in FIG. 12 assembled with and mounted on the mounting frame 254 of FIG. 13. The guard frame 312 has been removed and does not appear in FIG. 14. The cantilever springs 301A–D have been folded ninety degrees about the lines 311 of FIG. 12 so that these springs are viewed on edge in FIG. 14. The outward end of each of the support filaments 14A–D is attached to the mounting ring 310 at the places indicated by the reference numerals 316. The free end of each of the cantilever springs 310A–D is attached to a corresponding face 318 of an attachment post at each corner of the mounting ring 310. The faces 318 of the attachment posts are angled away from the center of the frame 254 to provide preload tension for the compliant filaments 300A–D. The inward end of each of the support filaments 14A–D and the inward end of each of the compliant filaments 300A-D is attached to the outer face of a cylindrical collar 258 having a sleeve which extends through the central opening 314 in the hub 308. The collar 258 is attached at its inner end to a mating sleeve 319 on the proof mass 10. Thus the collar 258 may be regarded as a portion of the proof mass 10, a connection member thereof connecting the proof mass 10 to the filaments 14A-D and 300A-D. The dimensions of either the collar 258 or the mating sleeve 319 relative to the dimensions of the central opening 314 of the mounting frame 254 are chosen so that their cooperation acts as the mechanical stop for excessive lateral loading. When lateral loading on the elastic suspension exceeds the design load, the exterior cylindrical surface of the collar 258 or mating sleeve 319 is brought into contact with the interior wall of the central opening 314 of mounting frame 254 before fracture of a filament can occur.

The spokes 312A-D of the mounting frame 254 are also disposed in a plane substantially perpendicular to the longitudinal axis 38 of the proof mass 10. Thus, the plane of the spokes is spaced apart from and parallel to the plane of the filaments. As may be seen in FIG. 14, each of the spokes 312A-D is paired with or aligned with a corresponding distinct one of the support filaments 14A-D and vice versa. The result is that a dimensional change in the filaments due to changes in temperature is precisely compensated by a corresponding change in the dimensions of the mounting frame 254 when the frame 254 is made of the same material as the filaments. Due to the good thermal expansion coefficient match between the filaments and their mounting frame, a relatively large thermal expansion or contraction can occur without significantly changing the force on the filaments.

By adopting the geometry shown in FIGS. 13 and 14 for the mounting frame 254, for the filaments 14A-D, and for the filaments 300A-D and by forming the mounting frame and filaments of the same material, changes in forces on the filaments due to changes in temperature are minimized in a much simpler, much more controllable and less expensive way than in the design discussed above in connection with FIGS. 2, 3 and 7. The result is the same, however. Thermal expansion and contraction of the filaments 14A-D and of the mounting frame 254 over a wide temperature range produces a negligible change, if any, in the tension preload on the filaments 14A-D.

FIG. 15 shows a ceramic housing cap 256 for the housing or case 12 of an accelerometer in accord with the invention. The housing cap has a cylindrically shaped central opening 320 aligned with the longitudinal axis 38 of the proof mass 10. The mounting frame 254 is disposed on the exterior side of the housing cap 256. The extended bushing 315 of the mounting frame 254 is fitted into the central opening 320 of the housing cap 256. Mounting frame 254 is attached or cemented to housing cap 256 at the bushing 315. The sleeve of the collar 258 extends through the central opening 314 of the bushing 315. The sleeve of collar 258 is attached to the mating sleeve 319 of the proof mass 10 in the interior of the instrument. As stated above, the exterior side of the collar 258 is attached to the inward ends of the support filaments 14A-D and the compliant filaments 300A-D. As is apparent in FIG. 15, excessive lateral load will drive the mating sleeve 319 into contact with the interior wall of the bushing 315.

FIGS. 11-15 show an elastic suspension having redundant constraint in the same sense as was discussed above in connection with the suspension of FIGS. 1-10. However, it is preferable to fabricate the suspension to have only three pairs of filaments, one support filament and one compliant filament per pair, as was previously discussed. This allows the accelerometer to be fabricated with greater ease and with larger tolerances for filament attachment. Greater stability of the null position is achieved at lower cost since the adverse effects of a slack support filament are avoided.

While the invention has been described with respect to the preferred embodiment thereof, it will be understood by those skilled in the art that various changes in form and details may be made therein without departing from the spirit and scope of the invention as set forth in the following claims.

What is claimed is:
1. An instrument, comprising:
 (a) a base member;
 (b) a suspended member having a central longitudinal axis; and
 (c) elastic suspension means for maintaining the position of said suspended member relative to said base member, wherein said elastic suspension means comprises:
  (1) a mounting frame, comprising:
   (i) a central hub attached to said base and substantially centered on said longitudinal axis;
   (ii) a plurality of spokes spaced apart from each other attached to and extending outward from said hub; and
   (iii) a mounting ring attached to said spokes substantially centered on said longitudinal axis, wherein said mounting ring has a radius larger than the radius of said hub; and
  (2) an array of support filaments, wherein an inward portion of each of said support filaments is attached to said suspended member, and wherein an outward portion of each of said support filaments is attached to said mounting ring.

2. The instrument recited in claim 1, wherein said support filaments are disposed in a first plane substantially perpendicular to said longitudinal axis of said suspended member for minimum displacement in response to lateral tensile loading.

3. The instrument recited in claim 2, wherein a portion of said suspended member extends into a central opening in said hub.

4. The instrument recited in claim 3, wherein the size of said central opening is selected to allow the inner walls of said central hub opening to act as a mechanical stop for said elastic suspension, whereby loading in excess of a design load for said suspension is absorbed by said hub thereby preventing fracture of said support filaments.

5. The instrument recited in claim 2, wherein said spokes are constrained by said mounting frame to lie substantially in a second plane perpendicular to said suspended member longitudinal axis, wherein said second plane is spaced apart from and parallel to said first plane.

6. The instrument recited in claim 5, wherein each of said support filaments is aligned with a corresponding distinct one of said spokes.

7. The instrument recited in claim 6, wherein said support filaments and said mounting frame are fabricated of the same selected material, whereby changes in tension in said support filaments due to changes in temperature are minimized.

8. The instrument recited in claim 7, wherein said material is a metal.

9. The instrument recited in claim 8, wherein said metal is beryllium copper.

* * * * *